United States Patent
Sala et al.

(12)

(10) Patent No.: US 6,748,307 B1
(45) Date of Patent: Jun. 8, 2004

(54) COLLISION SENSING SYSTEM

(75) Inventors: Dorel M. Sala, Troy, MI (US); Jenne-Tai Wang, Troy, MI (US); Mark O. Neal, Rochester, MI (US); Chin-Hsu Lin, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/303,677

(22) Filed: Nov. 25, 2002

(51) Int. Cl.$^7$ .................. B60R 21/01; B60R 21/32; B60R 21/00
(52) U.S. Cl. .................. 701/46; 701/45; 280/734
(58) Field of Search .................. 701/45, 46, 47; 180/274, 282; 280/731, 732, 734, 735, 742; 340/436

(56) References Cited

U.S. PATENT DOCUMENTS

| | | | | |
|---|---|---|---|---|
| 5,014,810 A | * | 5/1991 | Mattes et al. | 180/268 |
| 5,229,943 A | * | 7/1993 | Eigler et al. | 364/424.05 |
| 5,490,067 A | * | 2/1996 | Teguri et al. | 364/424.05 |
| 5,498,028 A | * | 3/1996 | Carlin et al. | 280/735 |
| 5,504,379 A | * | 4/1996 | Mazur et al. | 307/10.1 |
| 5,702,124 A | * | 12/1997 | Foo et al. | 280/735 |
| 5,899,948 A | * | 5/1999 | Raphael et al. | 701/45 |
| 6,236,921 B1 | * | 5/2001 | McConnell | 701/45 |
| 6,438,475 B1 | * | 8/2002 | Gioutsos et al. | 701/45 |
| 6,496,764 B1 | | 12/2002 | Wang | 701/45 |
| 6,512,969 B1 | | 1/2003 | Wang | 701/45 |

OTHER PUBLICATIONS

Patent Application Publication 2002/0077736 A1, published Jun. 20, 2002.

* cited by examiner

*Primary Examiner*—Tan Q. Nguyen
*Assistant Examiner*—Dalena Tran
(74) *Attorney, Agent, or Firm*—Kathryn A. Marra

(57) ABSTRACT

A computer based method for activating a vehicular safety device for passenger protection is disclosed. The method uses two front-end acceleration sensors and a passenger compartment sensor. When a collision situation is sensed, current acceleration data is integrated to produce velocity and displacement values for the sensor locations. The velocity and displacement values are selectively used in at least three vehicle collision mode analyses. Examples of such collision modes are a full frontal mode, an angle mode and an offset deformable barrier mode. Each collision mode has sub-modes corresponding to the desired levels of airbag inflation. When appropriate threshold values are exceeded, device activation for one or more activation stages is initiated.

23 Claims, 8 Drawing Sheets

COLLISION SENSING SYSTEM

TECHNICAL FIELD

This invention pertains to computer based methods for determining whether a frontal or angular collision situation in a vehicle may require activation of a safety device. More specifically, this invention pertains to the placement of acceleration sensors in a vehicle and the continuous selective use of their integrated velocity and displacement signals in frontal and angular collision situations to help to determine whether a safety device, such as a passenger compartment air bag, is to be activated and, if so, how it is to be activated.

BACKGROUND OF THE INVENTION

Safety devices for the protection of the operator and passengers of automotive vehicles have been in use for many years. Many safety features function in a collision situation without external activation. Seat reinforcement, seat headrests, and passenger compartment padding are examples of such safety items. Other safety devices such as supplemental inflatable restraints, popularly known as air bags, require external activation when a collision event is apparently occurring.

Air bags comprise an inflatable bag, an electrically actuated igniter and a gas generator. Each bag is folded and stored with its igniter and gas generator in vehicle locations, such as, the steering wheel pad, instrument panel, door panel or body pillar. Air bags also require a collision detection system that determines when the bags should be deployed and signals the ignition of one or more charges (or stages) of the gas generator. Some passive passenger protection systems, rely on acceleration sensors (detecting abrupt vehicle deceleration) and a micro-processor based controller. An acceleration sensor is a device that continually senses accelerative forces and converts them to electrical signals. The controller continually receives acceleration signals from each sensor and processes them to determine whether a collision situation is occurring that requires air bag deployment.

The content of such a collision detection system for safety device actuation usually depends upon the method or algorithm used by the controller for assessing collision severity. Most systems rely on an acceleration sensor placed in the passenger compartment, close to the center of gravity of the vehicle. This sensor is often put under the passenger seat as part of a sensing and diagnostic module (SDM) of the vehicle collision sensing system. In addition, some systems place one or more accelerometers at the center or sides of the radiator cross-tie-bar (called electrical frontal sensors, EFS) to detect vehicle front-end deceleration indicative of a collision. The collision detection controller receives signals from the acceleration sensor(s) and evaluates them in a pre-programmed manner to determine whether air bag deployment is necessary. The program may also determine the degree of deployment, e.g., one or two inflation stages, of the bag.

The algorithms of collision sensing controllers have involved differing degrees of complexity. For example, acceleration values from a single sensor (e.g., the SDM sensor) have been compared with a pre-determined threshold acceleration value as a test for device deployment. Values from more than one sensor location have been used in the collision sensing practices. Acceleration values have been integrated over time to yield crush velocities, and further integrated to yield crush displacement values. Further, the derivative of acceleration values have been determined as "jerk" values. Such velocity and displacement values, and jerk values, have also been compared with respective pre-determined threshold values as a more selective basis for achieving timely air bag deployment. Also, acceleration data has been used in combination with seat occupancy information and seat belt usage to determine air bag deployment.

There are variants in vehicle front-end collision modes and, of course, there can be considerable variation in the severity of a collision depending upon the relative structure and mass of the vehicle and its collision object as well as the relative velocities at the onset of a collision. With respect to front-end collision modes, a vehicle may collision head-on with another vehicle or fixed object in a frontal collision mode. Front-end collisions of a vehicle with other vehicles often occur in an angular mode between head-on (zero degree) and a side-ways collision (ninety degrees). A further distinction is often made between an angular collision with a rigid or non-yielding object and an offset deformable barrier (ODB mode). Exemplary vehicular collision testing reveals different patterns of front end and passenger compartment crush velocities and displacements associated with different collision modes. In fact, considerable collision testing of a vehicle has been required to provide the substantial database of threshold values of jerk, acceleration, velocity and/or displacement over a collision period for use by a collision sensing controller. Such data must be compiled from suitably instrumented test vehicles over the relevant duration of each test collision period. Depending upon the nature and severity of a collision, an airbag deployment decision may be made by the controller process at any time during a period of from about 15 milliseconds (ms) to 70 ms or so from the onset of the collision.

It would be desirable to further calibrate the control systems for airbags and other such devices. It is common practice in calibrating such control systems to develop the required calibration data from measurements taken in exemplary collision testing of each new vehicle model so that the control system calibration for that model is established according to its collision characteristics. It would be desirable to provide a calibration method which does not require actual testing of vehicles or reduces the need for testing of vehicles. In the prior art, attempts have been made to discriminate the severity of the collision event using acceleration and jerk signals which are difficult to generate from computer simulations, such as finite element analysis. It would be desirable to obtain a collision sensing system algorithm that relies upon velocity based measures which can be obtained without collision testing prototype vehicles to calibrate the collision sensing system. Preferably, the velocity based measures are obtained by use of computer or finite element models for calibration of collision sensing systems.

Accordingly, it is an object of this invention to provide an alternative method of activating an air bag or other collision-responsive safety device that can utilize only velocity and displacement values obtained from a suitable collision model. It is a further object of this invention to provide an airbag activation method that utilizes a consideration of more than one vehicle collision mode in use of time integrated acceleration sensor data.

SUMMARY OF THE INVENTION

This invention provides a vehicle collision sensing system which helps to determine when to actuate a safety device.

This is accomplished by use of vehicle mounted accelerometers and an associated signal processing algorithm in a microprocessor. The collision sensing algorithm is composed of parallel assessment-branches or modules for detecting different collision modes, each of which uses only current velocity and displacement measures calculated by integrating the acceleration data recorded from vehicle mounted accelerometers.

In accordance with the invention at least two front end acceleration sensors are employed together with at least one sensor in the passenger compartment. For example, two frontal acceleration sensors (EFS), may be mounted at the left and right sides of the radiator cross-tie-bar in the engine compartment of the vehicle for sensing the acceleration of the tie-bar. The vehicle is also provided with an accelerometer in the passenger compartment, such as a location underneath the passenger seat as a part of a sensing and diagnostic module (SDM) of the vehicle collision sensing system. The vehicle collision sensing system detects and discriminates the severity of the collision incidents by signals derived from the front end (EFS) acceleration sensors and the SDM acceleration sensor. Such derived signals are used in the signal processing algorithm of this invention which is implemented in the control program within the microcomputer of the collision sensing system.

In a preferred embodiment of the invention, the control method uses sensor data in a manner to determine air bag inflation needs in each of a frontal collision mode, an angular collision mode and an ODB collision mode. A different combination of representative collision modes could be used but these three are exemplified. In general, the collisions are classified into different modes based on similar signal patterns. The name one chooses for the modes is indicative of the main type of collisions that fall into that classification, e.g. frontal mode characterizes the events with patterns similar to the full frontal barrier events, angle mode characterizes the events with patterns similar to the angle barrier events, etc. Other type of collisions may have similar patterns with the ones in the modes already chosen, e.g. pole events may behave relatively similar to the ODBs or offset rigid barrier events may behave similar to the full frontal events, and accordingly are classified into those modes.

When activated by a representative acceleration value indicative of a possible collision, the subject method proceeds by integrating acceleration data from each of three sensors to obtain corresponding velocity and displacement values for each sensor location. Thus, the acceleration data recorded at both radiator tie bar sensors (Al and Ar) and SDM (As) are used to calculate Vs, Vlm, Vrm, Ss, Sl, and Sr. Here Vs and Ss denote the velocity and displacement, at SDM, respectively; and Vlm, Vrm, Sl, and Sr denote the maximum velocity and displacement at the left and right front-end accelerometer locations, respectively. These values are selectively used in a series of three parallel collision mode calculations and logical tests, namely a frontal mode module, angle mode module, and ODB (offset deformable barrier) mode module. Preferably, each collision mode module has two sub-modules, i.e. the $1^{st}$ and $2^{nd}$ stage airbag deployment modules.

Suitably, the sensing algorithm uses the acceleration signals, As, from the SDM accelerometer to enable (or initiate) operation of the collision sensing method of this invention. The control method determines whether the acceleration, As, at the passenger compartment location is equal to or greater than a predetermined acceleration threshold which, for example, may be set at 2 g's (g being the acceleration due to gravity). If As is not greater than the enable threshold, the program loops back to monitoring the input. This controller cycle is repeated every millisecond or so. If As is equal to or greater than the threshold, the program advances to the next step, i.e. to initiate the system clock and to calculate the several velocity and displacement measures. The sensing system is reset for minor incidents by a reset module which determines whether the velocity measure, Vs, is equal to or greater than a predetermined threshold. If Vs is not equal to or greater than the reset threshold, the program loops back to monitoring the input. If Vs is greater than the threshold, the program advances to the next step.

Once the collision severity determining method is enabled the velocities and displacements are calculated and entered into the three branching program modules; the frontal mode module, angle mode module and ODB mode module. The module for which the $1^{st}$ stage thresholds are first exceeded initiates the deployment of the airbag. Then its corresponding $2^{nd}$ stage sub-module determines the severity of the collision by comparing the measures with another set of thresholds. The other modes are ignored after a first stage deployment decision has been made.

In the frontal mode-first stage assessment, velocity values are used. It has been observed that the velocity measures, Vs, Vlm and Vrm are generally higher for severe frontal full-barrier-like impact events. Accordingly, they are used in the method of this invention to determine whether or not to trigger the deployment of the first stage airbag inflator for this type of impact events. If, and only if, all three velocity measures for an event are equal to or greater than a set of velocity thresholds, predetermined by experiment or calculation for the vehicle, the program will send a triggering signal out to ignite the first stage air bag inflation.

If first stage air bag inflation has been commanded through the frontal mode program module, the frontal mode—2nd stage determination is made. Again, the velocity measures, Vs, Vlm and Vrm are used here to determine whether or not to trigger the deployment of the second stage airbag inflator for this type of frontal full-barrier-like impact events. However, unlike the first stage, an "or" logic is used to allow a second stage deployment when either one of Vs or "Vlm and Vrm" meets the threshold condition.

In parallel with its analysis of the frontal mode-first stage the controller is also analyzing the angle (or angles) collision mode—1st stage and the ODB collision mode-first stage. As stated, results from any collision mode analysis can trigger first stage air bag inflation.

In the case of the angle collision mode-first stage, it has been found that either the passenger compartment velocity measure, Vs, or the front end displacement measures, Sl and Sr (depending upon which side of the vehicle is impacted) are generally high for severe angle-like impact events. Accordingly, it is preferred to use them in the angle mode to determine whether or not to trigger the deployment of the first stage airbag inflator for this type of impact events. In assessing the second stage of the angle mode a suitably high left front end velocity measure, Vlm, can trigger the second stage airbag inflator. In the alternative, a suitably high velocity value at the right front end sensor, Vrm, in combination with a suitably high SDM displacement, Ss, can trigger second stage deployment for right angle-like collision events.

In the ODB mode-first stage a combination of displacement at the SDM and velocity at the affected side are used in assessing the severity of an ODB collision mode type event. Thus, a combination of Ss and Vlm are used to determine whether to trigger deployment of the first stage inflator for a left side and a combination of Ss and Vrm for a right side event. For an ODB-second stage determination Vs and Sl are used for discriminating left side events and Vs and Sr for right side events.

Thus, this invention provides a collision severity determination method that identifies distinct front end vehicle collision modes and associates with these modes crush velocity and displacement data from selected vehicle body acceleration sensor locations. The collision detection controller continually compares acceleration data with a predetermined threshold value indicative of a collision possibility. The controller then determines current values of crush velocity and displacement at sensor locations at the front of the vehicle body and in the passenger compartment. Suitable selections are made from these values to assess, in parallel, each of at least three collision modes to determine activation of an air bag or other safety device. This practice is readily adaptable to managing two or more levels of device activation.

A critical feature of a collision severity determination method is the availability of suitable threshold velocity and displacement values over a period of up to 100 ms for each acceleration sensor and device activation. These threshold values may be based on physical collision test data for the specific vehicle, or collision model data, or a combination of test data and modeling.

Other objects and advantages of the invention will become apparent from a detailed description of illustrated embodiments which follows.

DESCRIPTION OF A PREFERRED EMBODIMENT

This illustrative embodiment of the collision detection algorithm of this invention uses three acceleration sensors. One sensor is located at each end of the radiator tie bar at the front of the vehicle engine compartment. They are sometimes referred to as EFS left side and EFS right side in this specification. The radiator tie bar is close to the front of the vehicle and it extends cross-wise so that the left and right sensors can experience different accelerations in impacts arising at an angle to the forward direction of travel. A third accelerometer is located under a front passenger seat in the passenger compartment of the vehicle. This location is a common location for an accelerometer that transmits data to the airbag inflation controller. This acceleration sensor location is sometimes also used for other vehicle or chassis control and/or diagnostic purposes, as in the sensing and diagnostic module (SDM). The acceleration sensors are electrically powered and continually supply their signals to the collision detection controller during vehicle operation. The controller includes a microprocessor that continually receives and analyzes acceleration data from the three sensors to determine whether a collision situation exists requiring deployment of an airbag. This invention provides a reliable and discerning process for such a determination.

In this embodiment of the invention three front end collision modes of the vehicle are utilized. One collision mode is a frontal mode representing a head-on collision of the vehicle with another vehicle or a fixed object such as a concrete wall. The second collision mode is an angular mode in which the object that is struck is fairly rigid but is struck at an offset angle between a head-on collision and a side impact. The third mode includes collisions that produce crush velocity and displacement data at the sensor locations representative of what is known in the collision analysis art as a collision with an offset deformable barrier. This type of collision typically has the characteristic of being initially somewhat milder early in the event and more severe later in the event.

Figure 1:
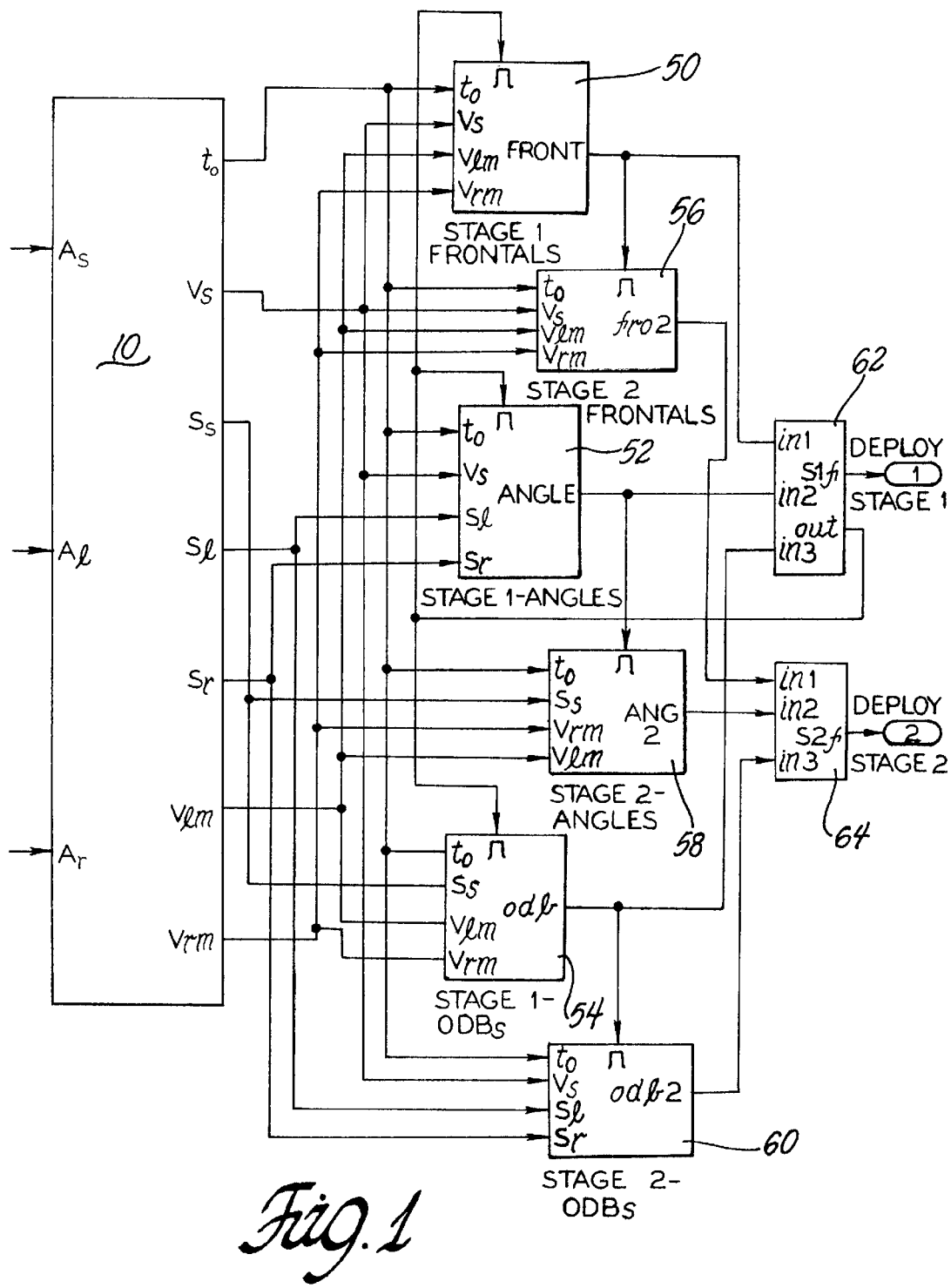
FIG. 1 is a process flow diagram for an air bag activation controller receiving continuous acceleration signals and, following the enabling process of FIG. 2, calculating current values of velocity and displacement for the acceleration sensor sites. The velocity and displacement values are applied in three parallel collision mode modules; a frontal mode, an angular mode and an offset deformable barrier mode; and the results, which may include two stages of deployment, are used in determining whether air bag activation is required.

FIG. 1 is a process flow diagram of a preferred three collision mode algorithm executed by a collision detection microprocessor in accordance with this invention. However, since vehicles normally operate without collisioning, accelerometer data is continually being generated without a need for execution of a collision mode analysis. Accordingly, the sub-process of FIG. 2, an enabling process for collision severity detection, is first employed. Thus, the processing box 10 in FIG. 1 continually receives acceleration data from the respective sensors as As, from the under seat SDM sensor, Al from the sensor at the left end of the radiator tie bar and Ar from the sensor at the right end of the radiator tie bar. The continuous signals are filtered and analog-digital converted in a known manner to provide discrete signals at one millisecond processing intervals. The function of processing block 10 is summarized in FIG. 2.

Figure 2:
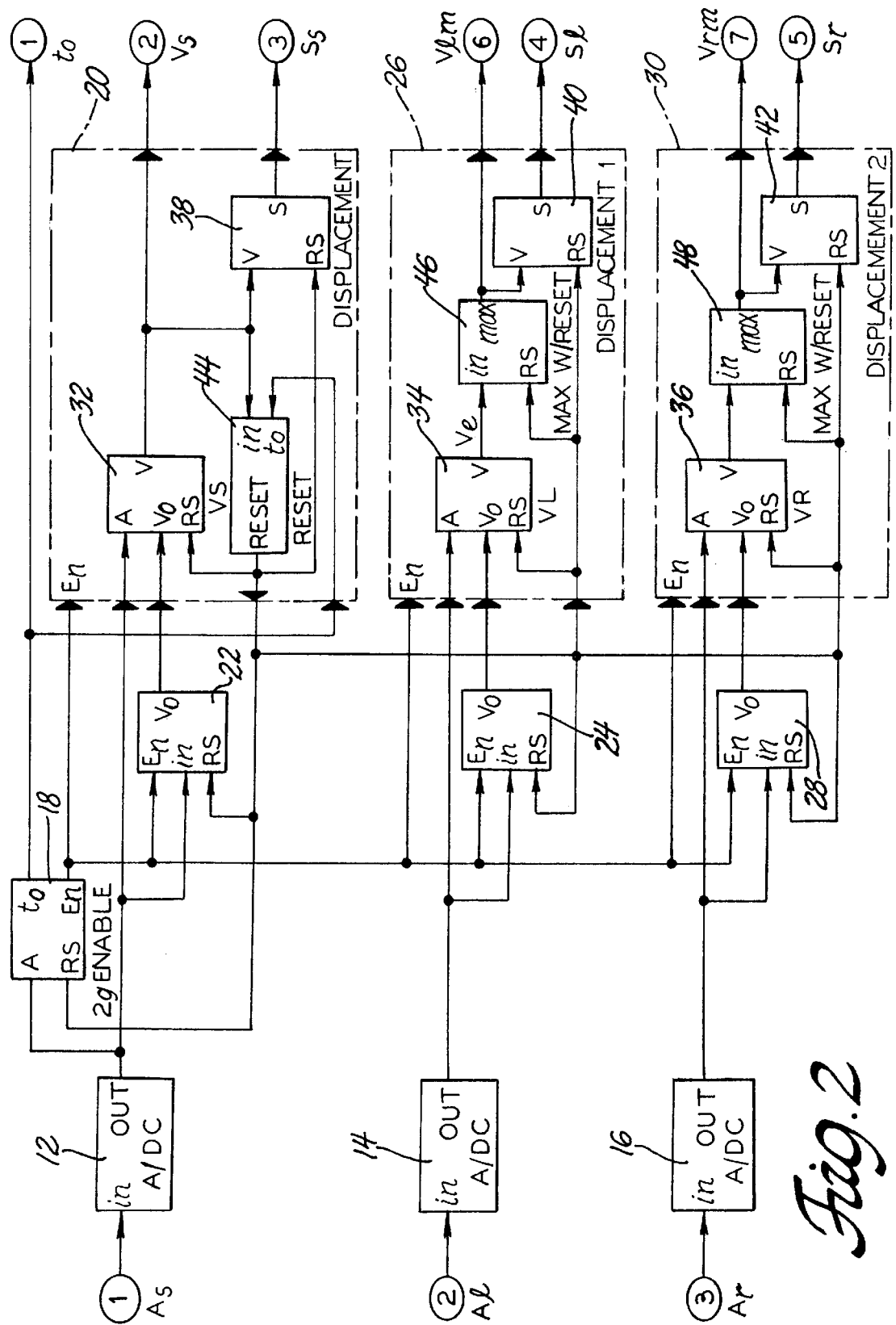
FIG. 2 is a process flow diagram for an air bag activation controller process for assessing acceleration data and determining whether the process of FIG. 1 is to be initiated. Upon such initiation, the process then calculates velocity and displacement values for the FIG. 1 process.

Referring to FIG. 2, the respective acceleration values enter boxes 12, 14 and 16. The function in these boxes includes analog signal to digital signal conversion (A/DC). Signal As is filtered and digitized in box 12. Al is filtered and digitized in box 14 and Ar is filtered and digitized in box 16. These signals are sampled every millisecond. The As signal (originating from the under seat location) is then sent to box 18 where its value of acceleration is compared with a predetermined collision acceleration threshold value. Such a value may be, for example, 2 g, or two times the magnitude of the acceleration due to gravity. If, and as usually will be the case, the As value does not exceed 2 g, the enable signal in box 18 remains "off" and the collision analysis does not proceed on this cycle. However, the current As, Al and Ar values are sent to accumulation boxes 22, 24 and 28, respectively. The function of accumulation boxes 22, 24, and 28 is to each retain ten or so acceleration values (As, Al and Ar, respectively) for integration as initial velocity values, Vo, in the event the collision analysis is enabled. Thus each new acceleration value displaces the oldest value from these accumulator storage boxes 22, 24, 28 so that a current value of the appropriate Vo is available in each box.

As stated, the basis of this enabling process is the under seat accelerometer signal. It is closest to the center of gravity of the vehicle and may be less sensitive to acceleration values obtained on bumpy roads and the like. However, other sensor locations could be selected for this enabling test function with a suitable threshold acceleration value.

Thus, generally, the collision severity analysis of the FIG. 1 process is not executed. However, upon an As value being received in block 18 that exceeds 2 g, or other suitable threshold value, an enable signal is issued by box 18. The enable signal is forwarded to modules 20, 26 and 30, as well as to accumulation boxes 22, 24 and 28. Enabled modules 20, 26, and 30 now allow the current and future values of As, Al and Ar to flow to velocity calculation boxes 32, 34 and 36, respectively. Accumulation boxes 22, 24 and 28 have been calculating current velocities, Vo, by adding (integrating) the last ten acceleration values from the respective sensors. The appropriate accumulation boxes are now sampled to provide their respective Vo values to the three velocity calculation boxes 32, 34 and 36.

Velocity calculation boxes 32, 34 and 36 use their initial $V_o$ values plus incoming acceleration values As, Al and Ar to determine Vs, Vl and Vr respectively by integration. In velocity box 32 the current value of the SDM sensor velocity Vs is thus determined and output as signal (2).

A current time signal, $t_o$, counting from the enable event, is output from enable box 18 as signal (1).

Time signals and Vs values are continually supplied to reset box 44. Incoming Vs values are compared with immediate predecessors. If the incoming value fails to exceed a predetermined threshold, e.g., 0.5 mph, within a specified time window, for example 10 ms, and its rate of increase is less than that corresponding to an acceleration of about 1 g thereon, a reset command is issued. Such a reset signal is sent to all relevant process boxes in FIG. 2 as indicated by the RS indicia in the boxes and the process is restarted with the next cycle. In other words, the initial As value that enabled the process is attributed to a non-collision related event.

A current velocity for the left front sensor location, Vl, is output from box 34 and sent to a maximum velocity value box 46. The current maximum value of Vl leaves box 46 as, Vlm, signal (6). Similarly, a current velocity for the right front sensor location, Vr, is output from box 36 and sent to a maximum velocity value box 48. The current maximum value of Vr leaves box 48 as, Vrm, signal (7). The current maximum velocity values in boxes 46 and 48 are also reset by a command from reset box 44.

The velocity calculation values Vs, Vlm and Vrm are also forwarded to their respective displacement calculation boxes 38, 40 and 42. The underseat accelerometer displacement, Ss, is calculated by integration of current and immediate past velocity values in displacement calculation box 38 and output as, Ss, signal (3). Similarly, the left front sensor displacement, Sl, is calculated in displacement calculation box 40 and output as, Sl, signal (4). And right front sensor displacement, Sr, is produced from displacement calculation box 42 and output as, Sr, signal (5). It is noted that front sensor displacements are calculated from the maximum velocity values. These signals correspond with the signals at the right side of the processing box 10 in FIG. 1.

Accordingly, the function of the sub-processing that is carried out in FIG. 2 is to determine whether a collision situation requiring air bag deployment may exist. This is determined by continually comparing As values with a predetermined threshold acceleration value. If the threshold value is exceeded, an enabling signal is issued causing the microprocessor to start the process of calculating the respective current values of velocity and displacement for each of the three sensor locations. The enabling signal is represented by n in boxes 50, 52, 54 56, 58 and 60. The respective process does not proceed in a box until it has been enabled by a previous determination.

Referring again to FIG. 1, it is shown that the outputs of the processing box 10, the summation of the processing in FIG. 2, comprises seven current values: $t_o$, Vs, Ss, Vlm, Sl, Vrm and Sr. Over the next several millisecond intervals the controller will continue to update these values as the potential collision situation develops. As they are determined the signals are used in the three collision mode analyses of this process. The appropriate time, velocity and displacement values are used for the first stage determinations of the frontal, angles and ODB modes. These calculations are illustrated and indicated in boxes 50, 52 and 54 respectively. These determinations are conducted generally in parallel (to the extent permitted by controller operation) and the specific analyses for the respective stage 1 boxes will now be described in more detail.

Figure 3:
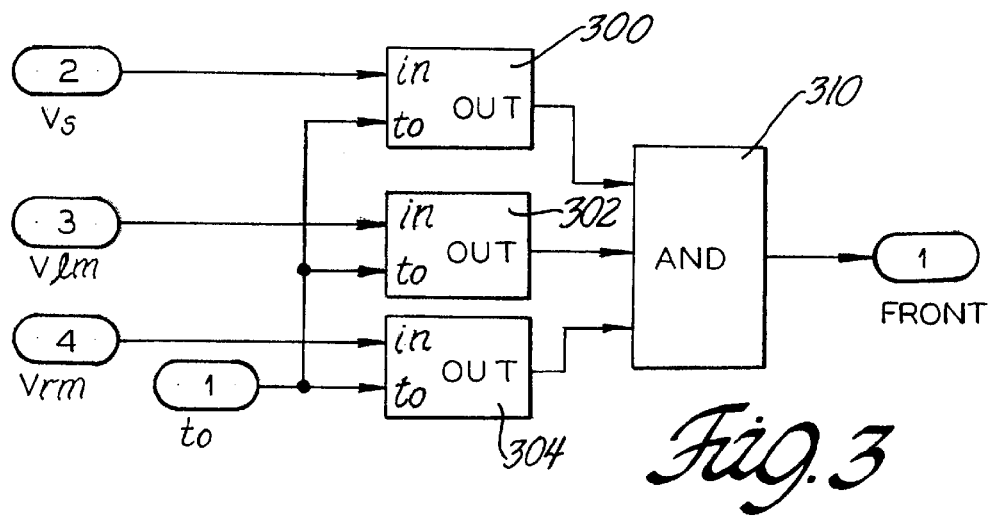
FIG. 3 is a process flow diagram for assessing first stage airbag deployment under the frontal vehicle collision mode.

FIG. 3 illustrates the analyses of the first stage of the frontal mode, the detailed logic of the process indicated in box 50 of FIG. 1. The first stage of the frontal collision mode is characterized by high values of Vs, Vrm and Vlm. These velocity values together with the current time count are each forwarded to respective comparison boxes 300, 302 and 304. In comparison box 300, the value of Vs is compared with a predetermined threshold velocity and, depending upon whether Vs is greater than the threshold velocity, an output of 1 for yes or 0 for no is forwarded to AND box 310. Similarly, the current value of Vlm is forwarded to comparison box 302 where a similar comparison is made with a suitable threshold velocity for the left end of the tie bar and a 0 for no or 1 for yes is forwarded to AND box 310. Likewise, the current value of Vrm is compared in box 304 with a predetermined threshold velocity value for the right end of the tie bar and a 1 or 0 is forwarded to AND box 310.

Figure 9A:
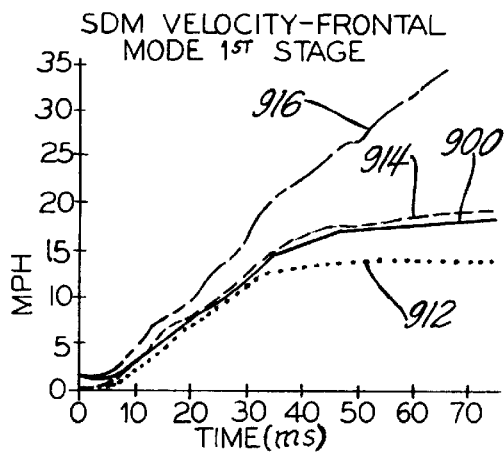
FIGS. 9–9F are graphs presenting illustrative threshold values of time based velocity data in miles per hour, mph, for frontal mode, first stage and second stage inflation, collision analyses. The data is presented for SDM, EFS left side and EFS right side sensor locations. The graphs also include velocity data at the sensor locations obtained from representative frontal mode collision events of a vehicle.
Figure 9D:
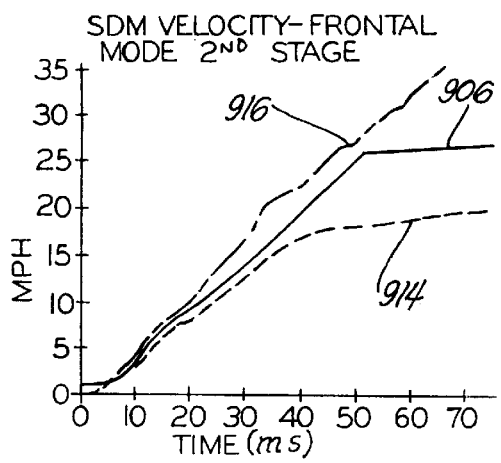
Figure 9B:
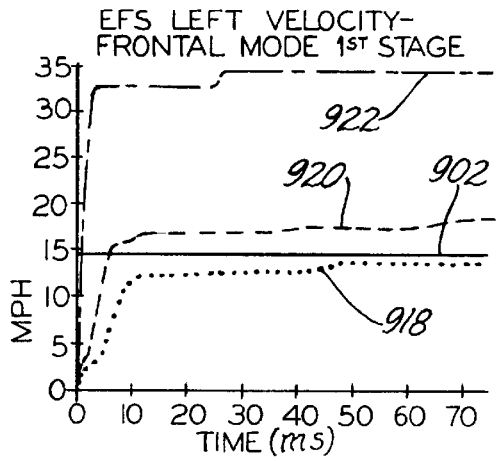
Figure 9E:
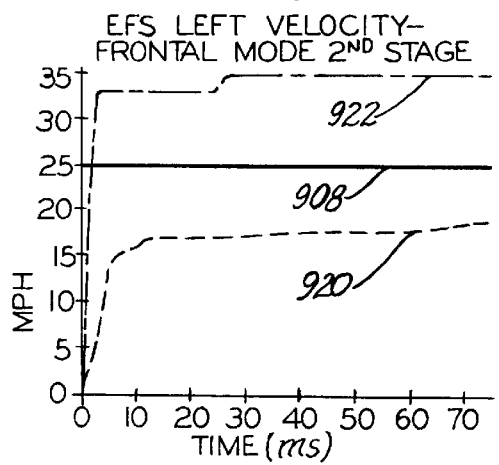
Figure 9C:
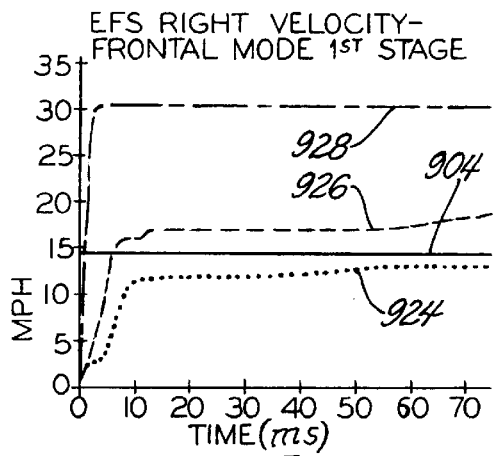

The threshold values are determined either by collision testing or by computer modeling to provide values that are reflective of a full frontal barrier collision under varying vehicle velocities. For example, with respect to a particular vehicle, suitable values of velocity thresholds are determined based on the velocity values at the required deployment time calculated from the beginning of a collision enabling event for a period up to 100 ms or so. FIGS. 9A through 9C are graphs of threshold values from zero to seventy-five milliseconds of SDM velocity 900, EFS left side velocity 902 and EFS right side velocity 904, respectively. The threshold velocity at the underseat location (FIG. 9A, curve 900) for the frontal collision mode is about one mile per hour at the required sensing time of six milliseconds from the onset of the collision enabling signal, for a severe collision event, and about five miles per hour at the required sensing time of 12 ms for a less severe event. Thereafter, the threshold values increase as per curve 900. Values selected from curve 900 are used in comparison box 300 depending upon the time, $t_o$, when the comparison is made. It will be appreciated that all of the velocity curves are exemplary and may be different for individual vehicles or collision situations or safety device parameters.

The threshold velocity values (from curves 902 and 904, respectively) for the frontal sensors, EFS left and EFS right, which are in the crush zone of the vehicle during a frontal full barrier collision, are set just below 15 miles per hour (for example) regardless of the number of millisecond intervals from the enabling signal.

Depending on the perceived severity of a collision, the required time for a deployment decision may vary from a few milliseconds to many milliseconds and, thus, threshold velocity and displacement values are predetermined for up to about 100 milliseconds. In general, the threshold values continue to increase over this period.

FIGS. 9A–9C also display exemplary full frontal mode collision velocity data for the SDM sensor and the left and right side EFS sensor locations. The dotted curves (912, 918 and 924) in these figures represent the velocities experienced at the respective sensor locations in a relatively low velocity impact—an impact that may not require first stage air bag deployment. It is seen that none of exemplary velocity curves 912, 918 or 924 exceeds the corresponding threshold velocity curve, 900, 902 or 904. The dashed line curves 914, 920 and 926 represent a higher velocity frontal impact—one that may require first stage airbag deployment. And each of curves 914, 920 and 926 exceeds the corresponding threshold velocity curve, 900, 902 or 904 within about ten milliseconds after the onset of the collision. Finally, the dot-dash curves, 916, 922 and 928, are the velocities experienced at the respective sensor locations during a high-speed full frontal impact that may require quick first stage air bag deployment. It is seen that the velocity at each of the sensors exceeds the corresponding threshold velocity within a few milliseconds of the collision.

Box 310 (FIG. 3) is an AND box which means that this first stage frontal mode analysis will issue a "deploy" command only if it receives a yes (or 1) signal from each of the velocity comparisons. FIGS. 9A–9C illustrate exemplary collision data in which the measured velocities at the SDM and EFS sensor locations consistently reflect this AND modal analysis. Thus a collision mode is characterized by a certain pattern of all the velocities and/or displacements at all sensor locations. The output "yes or no" is forwarded to the second stage-frontal mode comparison box 56, FIG. 1, and to the stage 1 deployment box 62. If the output from box 50 is yes, and it is the first collision mode comparison box to issue a "yes" command, such signal will prompt a "deploy" command from stage 1 deployment box 62 and air bag inflation will be initiated. A timely "yes" output from box 50 will also initiate a second stage frontal mode evaluation to be started in box 56. Also, box 62 will issue a command stopping further collision evaluations in first stage angles mode and ODB modes comparison boxes 52 and 54.

Thus, first stage deployment box 62 is an OR box and the first deployment command to reach it from any of the collision mode comparison boxes 50, 52 or 54 will prompt first stage air bag inflation. As soon as a first stage deployment decision is reached in one of the three collision modes, such decision comparisons are terminated in the other two modes. Second stage deployment comparisons are continued only in the collision mode that first issues a first stage deployment command.

In the event that the first cycle of first stage frontal mode comparisons result in a "no", and the other first stage collision mode results are "no," new velocity and displacement values are input to boxes 50, 52 and 54. The controller continues to cycle through these collision mode determinations until a "yes" is produced or until enough cycles elapse and it is concluded that the event that started this processing does not require air bag deployment.

The first stage-frontal mode analysis has been completed above. The angle mode and ODB mode first stage analyses will now be described.

Figure 5:
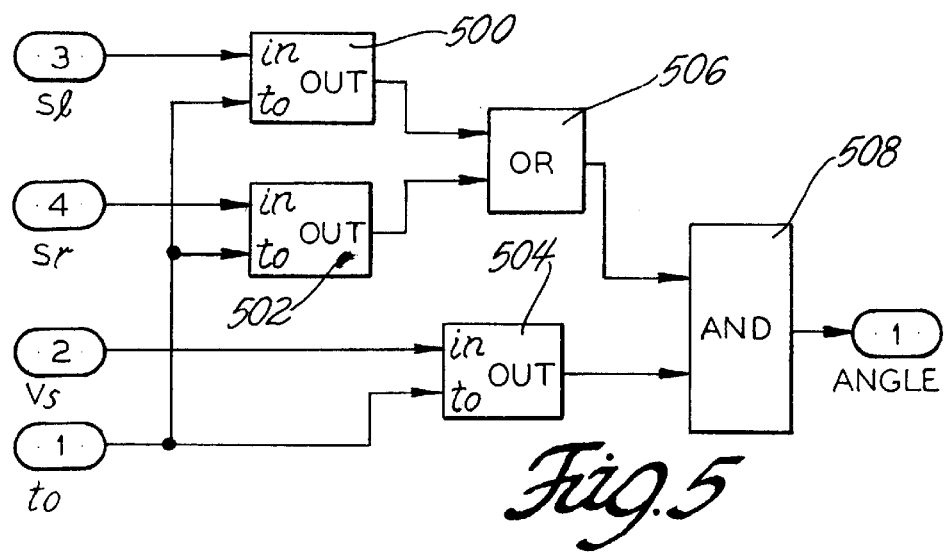
FIG. 5 is a process flow diagram for assessing first stage airbag deployment under the angles (or angle) vehicle collision mode.

The angles mode, first stage, analysis is illustrated in FIG. 5. It is a detailed description of the analysis executed in box 52 of FIG. 1. Angle(s) impact modes, first stage, are characterized by relatively large displacement values at either the right or left tie bar sensors and large velocity value at the underseat SDM sensor. Accordingly, these values together with the time count are used in the FIG. 5 angle mode, first stage comparison. Current values of Sl and Sr enter comparison boxes 500 and 502 respectively. Vs signals enter comparison box 504. Values of event time count to are used in each box.

Figure 10A:
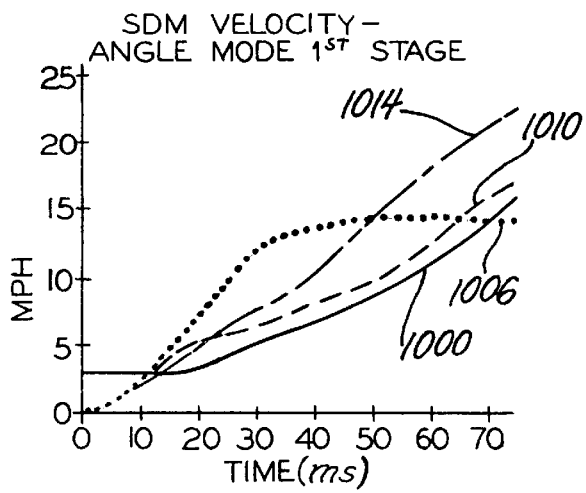
FIGS. 10A–10D are graphs presenting illustrative threshold values of time based velocity data, mph, and displacement data in centimeters, cm, for angle mode, first stage inflation, collision analyses. The data is presented for SDM, EFS left side and EFS right side sensor locations. The graphs also include velocity and displacement data at sensor locations obtained from representative, left side impact and right side impact, angle mode collision events of a vehicle.
Figure 10C:
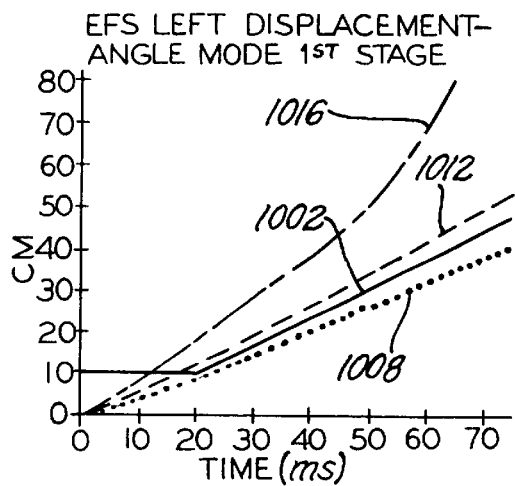
Figure 10B:
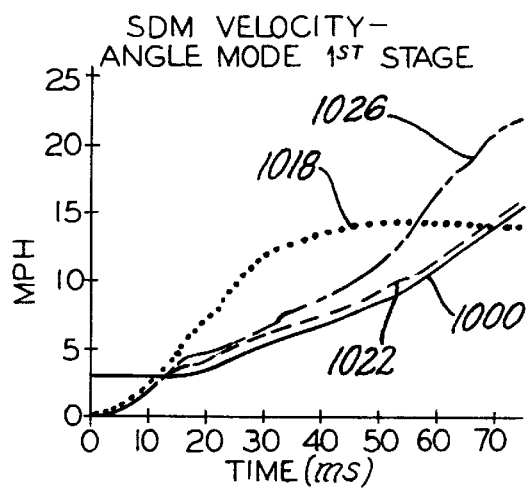

FIGS. 10A–10D are graphs showing first stage threshold values for SDM velocity in mph and EFS left and right displacements in centimeters. Curve 1000 in FIGS. 10A and 10B presents SDM threshold velocity values over the first 75 milliseconds of an angle mode collision for an illustrative vehicle. Curves 1002 (FIG. 10C) and 1004 (FIG. 10D) present EFS left and EFS right threshold displacement values.

The respective Sl, Sr and Vs comparisons with suitable threshold values are made in comparison boxes 500, 502 and 504. If either the Sl or Sr comparisons yields a "1" (yes), then 1 is output from OR box 506 to AND box 508. The output from Vs comparison box 504 is forwarded to AND box 508. AND box 508 must receive "1"s from both comparison box 504 and OR box 506 to issue a "1" to angle mode, first stage output, angle (1). The angle (1) signal from box 52 is forwarded as input 2 to OR box 62, FIG. 1, which is the first stage deployment decision box.

FIGS. 10A and 10C also present exemplary SDM velocity data and EFS left displacement data for two left side, angle mode impacts of increasing severity and a non-deploy full frontal barrier event. In a left side angle impact the right side EFS displacement is low and does not affect the analysis of FIG. 5. Dotted line 1006 is a graph of SDM velocity data for the relatively mild full frontal barrier impact and dotted line 1008 is the corresponding displacement data for EFS left. This collision event will not result in airbag deployment because only curve 1006 exceeds its threshold curve 1000. Curve 1008 does not exceed threshold curve 1002.

Dashed line curves 1010 and 1012 represent SDM velocity and EFS left displacement curves, respectively, for a more severe left side angle impact. Both curves, 1010 and 1012, exceed their corresponding threshold curves 1000 and 1002 and first stage air bag deployment would be initiated by the analysis of FIG. 5. Dot-dash curves 1014 and 1016 represent SDM velocity and EFS left side displacement curves, respectively, for a still more severe left side angle impact. Both curves, 1014 and 1016 exceed their corresponding threshold curves 1000 and 1002 and first stage air bag deployment would be initiated by the analysis of FIG. 5.

Figure 10D:
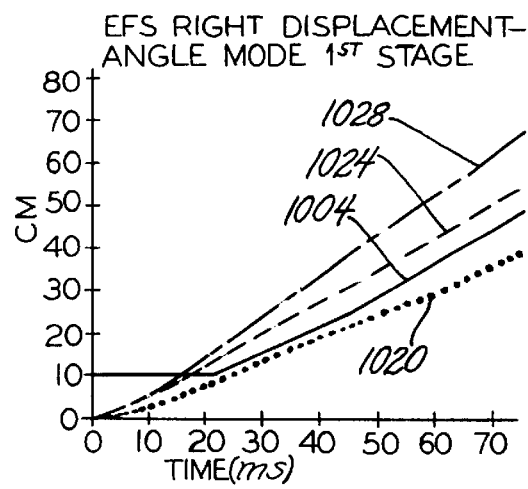

FIGS. 10B and 10D present exemplary SDM velocity data and EFS right side displacement data for two right side angle impacts of different severity and a non-deploy full frontal barrier event. Although not all data is identical, the analysis parallels the above discussion of the left side angle impacts. Dotted line curves 1018 (SDM velocity) and 1020 (EFS right side displacement) again represent the relatively mild full frontal collision not requiring airbag deployment. Dashed line curves 1022 (SDM velocity) and 1024 (EFS right side displacement) represent a more severe collision initiating first stage deployment. Dot-dash curves 1026 (SDM velocity) and 1028 (EFS right side displacement) represent a still more severe collision that the FIG. 5 analysis will conclude requires first stage deployment.

As stated above, the first positive deployment command to reach box 62 initiates first stage air bag deployment. Otherwise, comparison processing continues in each of the first stage collision mode analyses.

Figure 7:
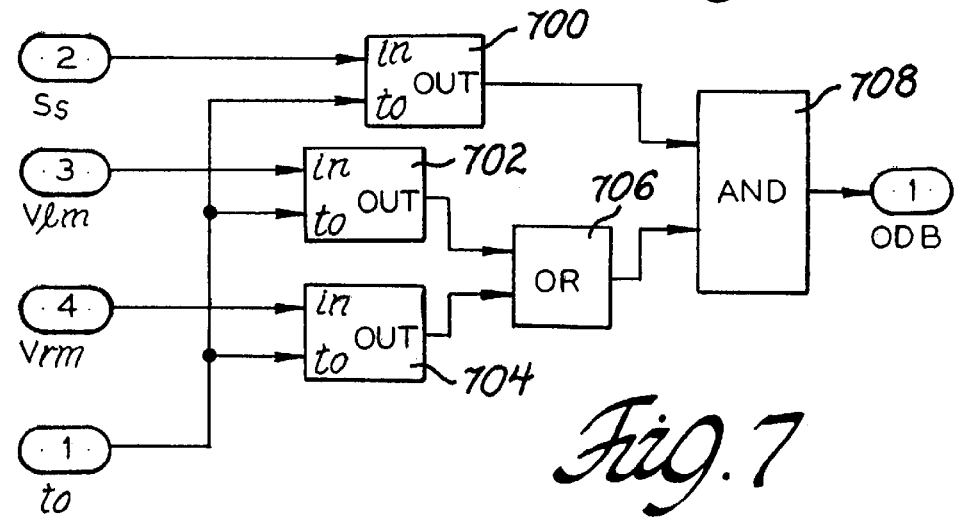
FIG. 7 is a process flow diagram for assessing first stage airbag deployment under the ODB vehicle collision mode.

FIG. 7 illustrates in detail the comparison analysis executed in box 54 of FIG. 1 for ODB mode, first stage. In ODB mode, first stage, the displacement of the underseat sensor, Ss, is used as well as the values of Vlm and Vrm. These values are forwarded, respectively, to comparison boxes 700, 702, and 704. The corresponding time, $t_o$, is forwarded to each comparison box.

Figure 12A:
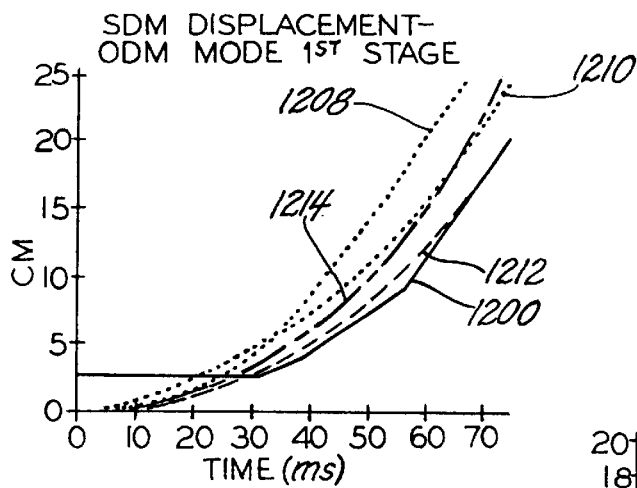
FIGS. 12A–12D are graphs presenting illustrative threshold values of time based velocity data, mph, and displacement data, cm, for OBD mode, first stage and second-stage inflation, collision analyses. The data is presented for SDM and EFS left side sensor locations. The graphs also include velocity and displacement data obtained from representative left side impact, OBD mode collision events of a vehicle.
Figure 12C:
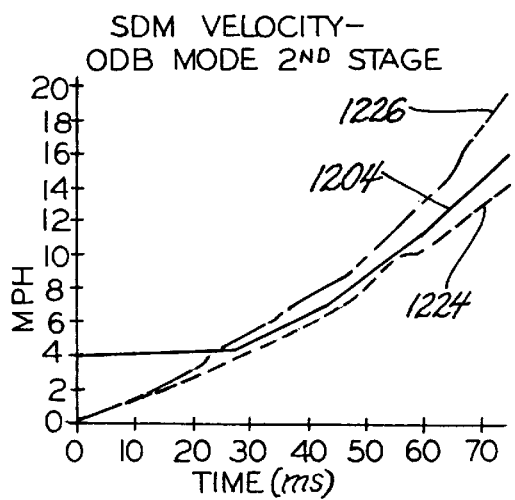
Figure 12B:
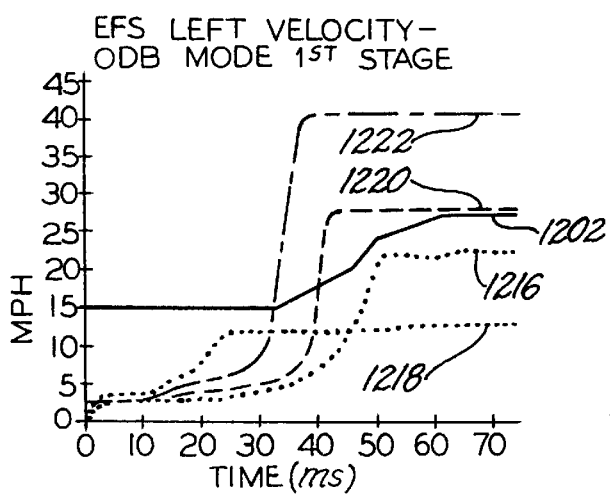

Threshold values for SDM displacement (curve 1200) and EFS left side velocity (curve 1202) are presented in FIGS. 12A and 12B. Also presented in these figures are exemplary SDM displacement data (curves 1208, 1210, 1212, 1214) and EFS left side velocity data (1216, 1218, 1220, 1222) from three ODB mode, left side impacts of varying severity and a non-deploy full frontal barrier collision.

Referring again to FIG. 7, Ss is compared with its time based, threshold in box 700, and the output "1" or "0" forwarded to AND box 708. Vlm is compared with its threshold value in box 702 and the output signal forwarded to OR box 706. Vrm is similarly subjected to comparison in box 704 and the output signal sent to OR box 706. Any positive result from OR box 706 is sent to AND box 708. Thus the requirement of the OBD mode, first stage is that Ss and either Vlm or Vrm exceed their respective threshold values before AND box transmits a deploy signal to ODB (1) and to air bag stage 1 deployment decision box, 62 in FIG. 1.

SDM displacement dotted line curves 1208 and 1210 represent a full frontal barrier collision and an OBD left side impact, respectively, that exceed the displacement threshold curve 1200. However, the EFS left side velocity data for these impacts, curves 1218 and 1216, respectively, do not exceed the velocity threshold, curve 1202. In view of the analysis strategy of FIG. 7, these dotted line impacts will not result in first stage airbag deployment. The ODB impact reflected by dashed line SDM displacement curve, 1212, and dashed line EFS left side velocity curve 1220 both exceed their corresponding threshold curves 1200 and 1202 and first stage airbag inflation will occur. Similarly, the OBD impact reflected-by dot-dashed line SDM displacement curve, 1214, and dashed line EFS left side velocity curve 1222 both exceed their corresponding threshold curves 1200 and 1202 and, again, first stage airbag inflation will occur.

Figure 4:
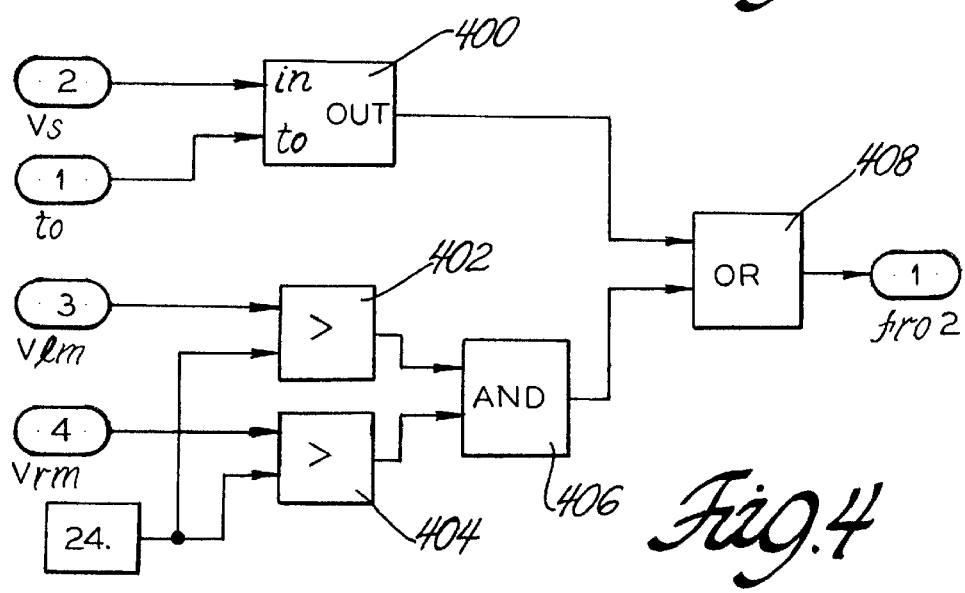
FIG. 4 is a process flow diagram for assessing second stage airbag deployment under the frontal collision mode.

The frontal mode, second stage deployment analysis is shown in FIG. 4. This analysis is executed in box 56 of FIG. 1. Current values of Vs and to enter comparison box 400. Larger time dependent threshold values are used in this second stage comparison. FIG. 9D, curve 906 is a graph of the second stage, threshold values of velocity (in mph) with respect to time for the SDM sensor location. The result of the comparison in box 400 goes to OR box 408.

Figure 9F:
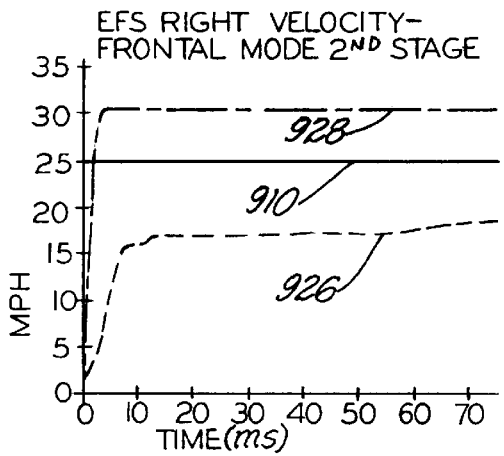

Vlm and Vrm values enter comparison boxes 402 and 404. Each is compared in this example with a constant velocity threshold value, here 25 mph. The threshold velocity values for the EFS left and right sensor locations are shown in FIGS. 9E and 9F, straight horizontal line curves 908 and 910, respectively. The results from comparison boxes 402 and 404 go to AND box 406. And the output from AND box 406 enters OR box 408. Providing Vs exceeds its threshold, or both Vlm and Vrm exceed their threshold, a deploy signal leaves OR box 408 to fro2 output and to the second stage deployment decision box 64 on FIG. 1. Otherwise, frontal mode, second stage processing continues until a positive signal is obtained or a specified time elapses.

FIGS. 9D–9F also illustrate exemplary velocity data in mph for the SDM sensor location and the EFS left and EFS right locations, respectively. SDM velocity curves 914 and 916 (FIG. 9D) reflect the same data as the corresponding curves in FIG. 9A. The collision events illustrated by curves 914 and 916 both exceeded the threshold curve 900 for a stage-one airbag deployment. But only the higher speed impact event reflected in curve 916 exceeds the curve 906 and will contribute to a second stage inflation of the airbag. Similarly, curves 920 and 926 do not exceed threshold curves 908 and 910. Curves 920 and 926 summarize exemplary velocity data for the EFS left side and EFS right side sensors, respectively, for the same collision event that would have caused a first stage airbag deployment but not a second stage deployment. However, velocity curves 916, 922 and 928 for SDM, EFS left and EFS right all exceed their second stage threshold curves 906, 908 and 910 and represent an exemplary collision that results in second stage airbag deployment.

Figure 6:
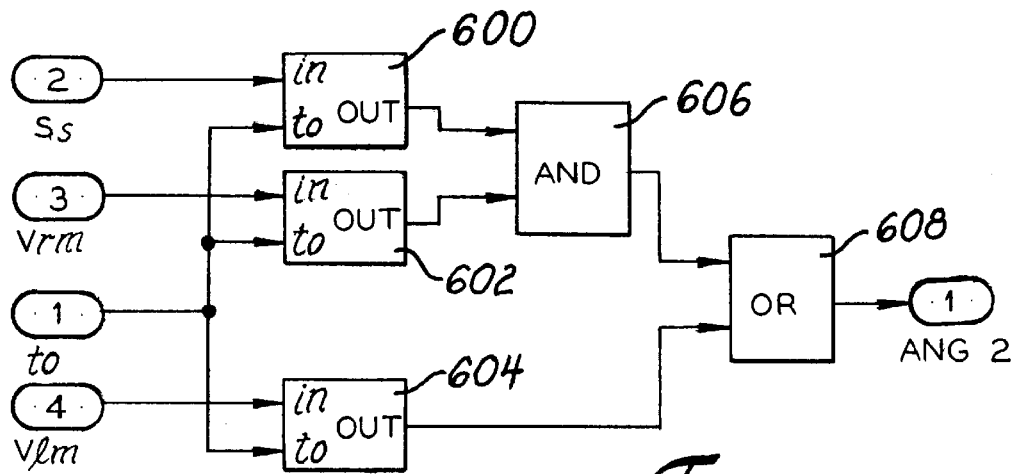
FIG. 6 is a process flow diagram for assessing second stage airbag deployment under the angles vehicle collision mode.

The angle mode, second stage comparison (executed in box 58 of FIG. 1) is illustrated in FIG. 6. Ss enters comparison box 600, Vrm enters comparison box 602 and Vlm enters comparison box 604. Current $t_o$ values enter each comparison box. The respective signals are compared with suitably higher, time based threshold values. The results from comparison boxes 600 and 602 enter AND box 606 and its result enters OR box 608. The result from comparison box 604 also enters OR box 608. Assuming both Ss and Vrm exceed their threshold values or Vlm exceeds it threshold a positive deployment signal ang 2 will leave OR box 608 and be transmitted to the second stage deployment decision box 64 of FIG. 1

Figure 11A:
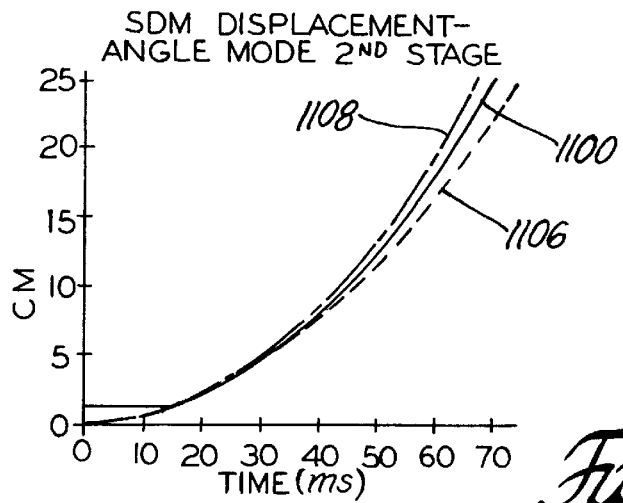
FIGS. 11A–11C are graphs presenting illustrative threshold values of time based velocity data, mph, and displacement data, cm, for angle mode, second stage inflation, collision analyses. The data is presented for SDM, EFS left side and EFS right side sensor locations. The graphs also include velocity and displacement data obtained from representative, left side impact and right side impact, angle mode collision events of a vehicle.
Figure 11B:
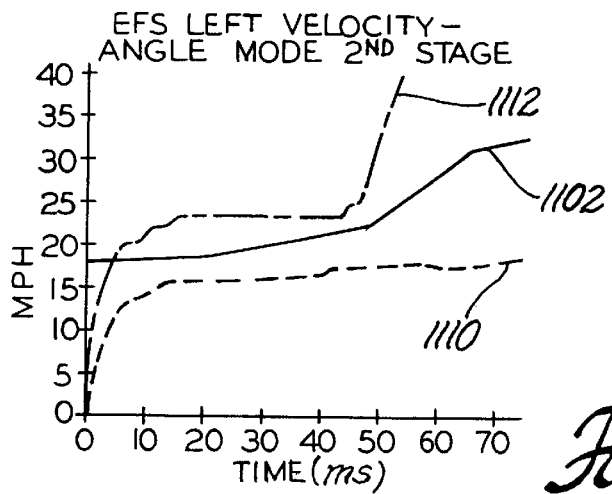
Figure 11C:
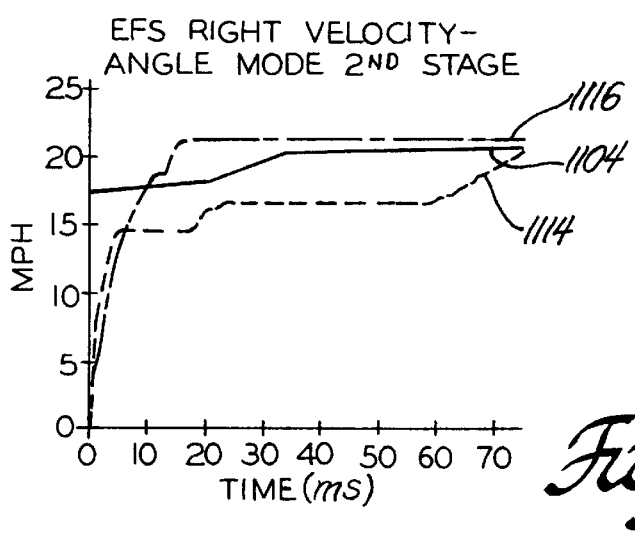

FIGS. 11A–11C show threshold values and illustrative collision data values for the Angle mode second stage analysis. For the right side angle impacts exemplary second stage threshold values for SDM displacement and EFS right velocity with respect to time are presented as curve 1100 in FIG. 11A and curve 1104 in FIG. 11C, respectively. The dashed line curves in FIGS. 11A and 11C illustrate collision data for SDM displacement (curve 1106) and EFS right velocity (curve 1114). This data is from the same angle mode collision as the dashed line curves in FIG. 10B and 10D. This data did not result in a FIG. 6 analysis decision to order second stage inflation of the airbag. The dot-dashed line curves in FIGS. 11A (curve 1108) and 11C (curve 1116) illustrate collision data for SDM displacement and EFS right velocity. This data is from the same angle mode collision as the dot-dashed line curves in FIG. 10B and 10D. This data did result in a FIG. 6 analysis decision to order second stage inflation of the airbag.

For the left side angle impacts exemplary second stage threshold values for EFS left velocity with respect to time are presented as curve 1102 in FIG. 11B. The dashed line curve in FIG. 11B represents collision data for EFS left velocity (curve 1110) for the same angle mode collision illustrated as the dashed line curves in FIGS. 10A and 10C. This data did not result in a FIG. 6 analysis decision to order second stage inflation of the airbag. The dot-dashed line curve in FIG. 11B (curve 1112) represents collision data for EFS left velocity for the same angle mode collision illustrated as the dot-dashed line curves in FIGS. 10A and 10C. This data did result in a FIG. 6 analysis decision to order second stage inflation of the airbag.

Figure 8:
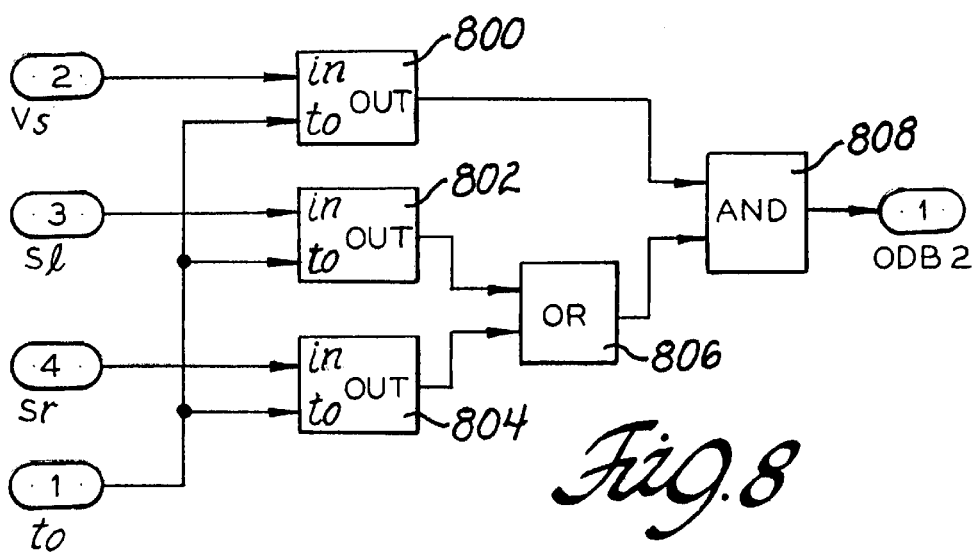
FIG. 8 is a process flow diagram for assessing second stage airbag deployment under the ODB vehicle collision mode.

The ODB mode, second stage analysis (executed in box 60, FIG. 1) is shown in FIG. 8. Vs enters comparison box 800, Sl enters comparison box 802 and Sr enters comparison box 804. Values of $t_o$ enter each of the three comparison boxes. Increased time based threshold values are used in this second stage comparison. The output of comparison box 800 goes to AND box 808. The outputs of comparison boxes 802 and 804 go to OR box 806 and its output to AND box 808. Providing that either Sl or Sr exceeds its threshold and Vs exceeds its threshold a positive signal is issued from AND box 808. Signal ODB 2 is transmitted to second stage deployment decision box 64 in FIG. 1.

Figure 12D:
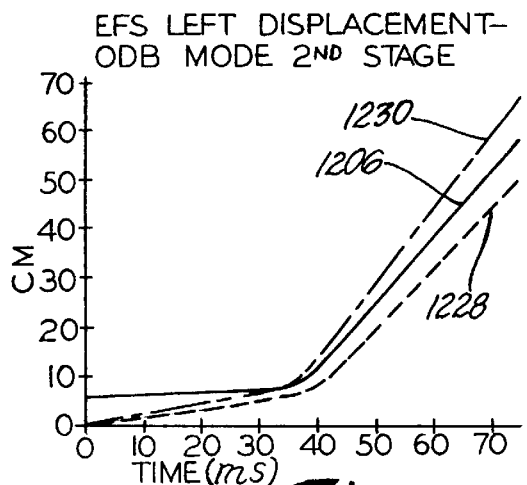

FIGS. 12C and 12D provide time based, second stage OBD mode threshold data for SDM velocity, curve 1204 and EFS left side displacement, curve 1206. Data from the two left side OBD mode collision events that initiated first stage airbag inflation in the FIG. 7 OBD mode analysis are included in FIGS. 12C and 12D. Dashed line curve 1224, SDM velocity data, and dashed line curve 1228, EFS left side displacement data, both fail to exceed their corresponding threshold curves 1204 and 1204. Accordingly, second stage airbag inflation is not ordered by a FIG. 8 analysis. In contrast, dot-dash line curve 1226, SDM velocity data, and dashed line curve 1230, EFS left side displacement data, both exceed their corresponding threshold curves 1204 and 1204. Accordingly, second stage airbag inflation is ordered by a FIG. 8 analysis.

The second stage deployment decision box 64 acts like an OR box. It receives signals from any of the second stage comparison boxes 56, 58 or 60. But in any collision event, box 64 receives signals from only the single activated second stage box from among boxes 56, 58 and 60.

It will be appreciated that all of FIGS. 9A–12D merely show exemplary values that are used for the purposes of explaining certain embodiments of this invention. It is not suggested that these are the actual threshold values or deployment levels that should be used in practice for any particular vehicle since there are numerous factors and trade-offs that must be considered for each vehicle situation.

The invention has been described in terms of certain preferred embodiments. However, it is apparent that other forms could readily be adapted by one skilled in the art. Accordingly, the scope of the invention is not to be limited only by the following claims.

What is claimed is:

1. A method of activating a safety device for vehicular passenger protection in a passenger compartment of a vehicle having a forward direction of travel in which it is susceptible to collision incidents in a frontal direction mode and in one or more angular direction modes, said vehicle having at least right side and left side acceleration sensors forward of said compartment, an acceleration sensor in said passenger compartment and a computer for continually processing acceleration signals from said sensors during vehicle operation, said method being executed on said computer and comprising the steps of:

continually comparing at least one of said acceleration signals with a predetermined acceleration value indicative of a passenger threatening collision and, if a said signal exceeds said value, proceeding with the following steps;

integrating each of said acceleration signals over time to determine a current sequence of velocity values for each of said sensor locations;

integrating each of said velocity values over time to determine current displacement values for each of said sensor locations;

comparing said velocity values with predetermined threshold velocity values for said sensor locations as a basis for determining whether a frontal mode collision situation requires safety device actuation;

comparing selected of said velocity and displacement values with predetermined corresponding velocity and displacement threshold values as a basis for determining whether an angular mode collision situation requires safety device activation and, if any one of said frontal or angular collision mode comparisons requires activation; and activating said device.

2. A method as recited in claim 1 in which said device is an inflatable air bag and said air bag is inflated by said activating step.

3. A method as recited in claim 2 in which only said velocity values are used in determining whether said frontal mode collision situation requires safety device activation and each said angular mode uses a combination of said velocity values and said displacement values as a basis for determining whether to activate said device.

4. A method as recited in claim 2 in which said device has been activated to a first stage of activation by a frontal mode collision situation, said method then further comprising the steps of:

comparing a current sequence of said velocity values with second stage threshold velocity values for said right side, left side and passenger compartment locations; and activating said device to a second stage of activation providing said velocity value at said passenger compartment exceeds its second stage threshold velocity and at least one of said right side or left side location velocity values exceeds its respective second stage threshold velocity.

5. A method as recited in claim 2 in which said displacement values for said left side and right side sensor locations are compared with first stage threshold displacement values for said locations and a velocity value for said passenger compartment sensor location is compared with a first stage threshold velocity for said location in an angle mode collision situation, and
    activating said device to a first stage of activation providing at least one of said displacement values exceeds its respective first stage threshold value and said velocity value exceeds its threshold first stage velocity value.

6. A method as recited in claim 5 in which said device has been activated to a first stage of activation by an angle mode collision situation, said method then further comprising the steps of:
    comparing said velocity values with second stage threshold velocity values for said right side and left side sensor locations;
    comparing said displacement value for said passenger compartment sensor location with a second stage threshold displacement value for said location; and
    activating said device to a second stage of activation providing said right side velocity value and said displacement value exceed their corresponding second stage threshold values or said left side velocity exceeds its corresponding second stage threshold value.

7. A method as recited in claim 2 in which said displacement value for said passenger compartment location and said velocity values for said right side and left side sensor locations are compared with corresponding first stage threshold displacement and velocity values in an offset deformable barrier collision mode, and
    activating said device to a first stage providing said passenger compartment displacement value exceeds its first stage threshold displacement value and at least one of said right side or left side velocities exceed their corresponding first stage threshold velocities.

8. A method as recited in claim 7 in which said device has been activated to a first stage of activation by an offset deformable barrier mode collision situation, said method then further comprising the steps of:
    comparing said right side and left side sensor location displacement values with second stage threshold displacement values for said locations;
    comparing said passenger compartment sensor location velocity value with a second stage threshold velocity value for said location; and
    activating said device to a second stage of activation providing said velocity value exceeds its threshold value and at least one of said displacement values exceeds its threshold value.

9. A method as recited in claim 1 in which said device is an air bag adapted to be inflated to a first stage of inflation and further to a second stage of further inflation, and said air bag is inflated only to said first stage following the steps of claim 1.

10. A method as recited in claim 9 comprising comparing selected of said velocity and displacement values with predetermined corresponding second stage threshold velocity and displacement values as a basis for determining whether either said frontal or an angular mode collision situation requires further safety device activation and, if any one of collision mode comparisons requires further activation, and
    activating said device to its second stage of activation.

11. A method as recited in claim 10 in which only said velocity values are used in determining whether said frontal mode collision situation requires second stage safety device activation and each said angular mode uses a combination of said velocity values and said displacement values as a basis for determining whether to activate said device.

12. A method as recited in claim 9 in which only said velocity values are used in determining whether said frontal mode collision situation requires safety device activation and each said angular mode uses a combination of said velocity values and said displacement values as a basis for determining whether to activate said device.

13. A method as recited in claim 9 in which said device has been activated to a first stage of activation by a frontal mode collision situation, said method then further comprising the steps of:
    comparing a current sequence of said velocity values with second stage threshold velocity values for said right side, left side and passenger compartment locations; and
    activating said device to a second stage of activation providing said velocity value at said passenger compartment exceeds its second stage threshold velocity and at least one of said right side or left side location velocity values exceeds its respective second stage threshold velocity.

14. A method as recited in claim 9 in which said displacement values for said left side and right side sensor locations are compared with first stage threshold displacement values for said locations and a velocity value for said passenger compartment sensor location is compared with a first stage threshold velocity for said location in an angle mode collision situation, and
    activating said device to a first stage of activation providing at least one of said displacement values exceeds its respective first stage threshold value and said velocity value exceeds its threshold first stage velocity value.

15. A method as recited in claim 14 in which said device has been activated to a first stage of activation by an angle mode collision situation, said method then further comprising the steps of:
    comparing said velocity values with second stage threshold velocity values for said right side and left side sensor locations;
    comparing said displacement value for said passenger compartment sensor location with a second stage threshold displacement value for said location; and
    activating said device to a second stage of activation providing said right side velocity value and said displacement value exceed their corresponding second stage threshold values or said left side velocity exceeds. its corresponding second stage threshold value.

16. A method as recited in claim 9 in which said displacement value for said passenger compartment location and said velocity values for said right side and left side sensor locations are compared with corresponding first stage threshold displacement and velocity values in an offset deformable barrier collision mode, and
    activating said device to a first stage providing said passenger compartment displacement value exceeds its first stage threshold displacement value and at least one of said right side or left side velocities exceed their corresponding first stage threshold velocities.

17. A method as recited in claim 16 in which said device has been activated to a first stage of activation by an offset deformable barrier mode collision situation, said method then further comprising the steps of:
    comparing said right side and left side sensor location displacement values with second stage threshold displacement values for said locations;

comparing said passenger compartment sensor location velocity value with a second stage threshold velocity value for said location; and activating said device to a second stage of activation providing said velocity value exceeds its threshold value and at least one of said displacement values exceeds its threshold value.

18. A method as recited in claim 1 in which only said velocity values are used in determining whether said frontal mode collision situation requires safety device activation and each said angular mode uses a combination of said velocity values and said displacement values as a basis for determining whether to activate said device.

19. A method as recited in claim 1 in which said device has been activated to a first stage of activation by a frontal mode collision situation, said method then further comprising the steps of:

comparing a current sequence of said velocity values with second stage threshold velocity values for said right side, left side and passenger compartment locations; and activating said device to a second stage of activation providing said velocity value at said passenger compartment exceeds its second stage threshold velocity and at least one of said right side or left side location velocity values exceeds its respective second stage threshold velocity.

20. A method as recited in claim 1 in which said displacement values for said left side and right side sensor locations are compared with first stage threshold displacement values for said locations and a velocity value for said passenger compartment sensor location is compared with a first stage threshold velocity for said location in an angle mode collision situation, and activating said device to a first stage of activation providing at least one of said displacement values exceeds its respective first stage threshold value and said velocity value exceeds its threshold first stage velocity value.

21. A method as recited in claim 20 in which said device has been activated to a first stage of activation by an angle mode collision situation, said method then further comprising the steps of:

comparing said velocity values with second stage threshold velocity values for said right side and left side sensor locations;

comparing said displacement value for said passenger compartment sensor location with a second stage threshold displacement value for said location; and activating said device to a second stage of activation providing said right side velocity value and said displacement value exceed their corresponding second stage threshold values or said left side velocity exceeds its corresponding second stage threshold value.

22. A method as recited in claim 1 in which said displacement value for said passenger compartment location and said velocity values for said right side and left side sensor locations are compared with corresponding first stage threshold displacement and velocity values in an offset deformable barrier collision mode, and activating said device to a first stage providing said passenger compartment displacement value exceeds its first stage threshold displacement value and at least one of said right side or left side velocities exceed their corresponding first stage threshold velocities.

23. A method as recited in claim 22 in which said device has been activated to a first stage of activation by an offset deformable barrier mode collision situation, said method then further comprising the steps of:

comparing said right side and left side sensor location displacement values with second stage threshold displacement values for said locations;

comparing said passenger compartment sensor location velocity value with a second stage threshold velocity value for said location; and activating said device to a second stage of activation providing said velocity value exceeds its threshold value and at least one of said displacement values exceeds its threshold value.

\* \* \* \* \*